United States Patent
Salvestro

(10) Patent No.: US 8,345,301 B2
(45) Date of Patent: Jan. 1, 2013

(54) ORTHOGONALITY CORRECTION EMPLOYING SUBSTITUTED IMAGE DATA

(75) Inventor: Aldo Salvestro, Burnaby (CA)

(73) Assignee: Eastman Kodak Company, Rochester, NY (US)

( * ) Notice: Subject to any disclaimer, the term of this patent is extended or adjusted under 35 U.S.C. 154(b) by 973 days.

(21) Appl. No.: 12/397,381

(22) Filed: Mar. 4, 2009

(65) Prior Publication Data

US 2010/0225956 A1    Sep. 9, 2010

(51) Int. Cl.
*G06F 15/00* (2006.01)

(52) U.S. Cl. .............. 358/1.18; 347/40; 347/78; 347/80; 358/1.8

(58) Field of Classification Search .................... 347/40, 347/78, 80; 358/1.8, 1.18
See application file for complete search history.

(56) References Cited

U.S. PATENT DOCUMENTS

| | | | |
|---|---|---|---|
| 6,081,316 A | 6/2000 | Okamura et al. | |
| 6,249,306 B1 * | 6/2001 | Isono et al. | 347/233 |
| 7,220,115 B2 * | 5/2007 | Silverbrook | 425/375 |
| 7,330,202 B2 | 2/2008 | Schweger et al. | |

FOREIGN PATENT DOCUMENTS

EP    1 211 882 A2    6/2002

* cited by examiner

*Primary Examiner* — Steven Kau
*Assistant Examiner* — Peter K Huntsinger
(74) *Attorney, Agent, or Firm* — Nelson Adrian Bush

(57) ABSTRACT

A method for forming an image in a skewed recording apparatus comprising a recording head comprising a plurality of recording channels, the method includes providing an image data file comprising a plurality of image data columns; assigning different portions of each image data column to different recording channels; substituting first image data from a first image data column assigned to a first recording channel with second image data from a second image data column assigned to a second recording channel; and operating the recording head to form the image.

36 Claims, 8 Drawing Sheets

ORTHOGONALITY CORRECTION EMPLOYING SUBSTITUTED IMAGE DATA

CROSS REFERENCE TO RELATED APPLICATIONS

Reference is made to commonly-assigned copending U.S. patent application Ser. No. 12/397,389 (now U.S. Publication No. 2010/0225981), filed Mar. 4, 2009, entitled IMAGING WITH CIRCULAR AND HELICAL SCANS, by Salvestro; U.S. patent application Ser. No. 12/397,395 (now U.S. Publication No. 2010/0225982), filed Mar. 4, 2009, entitled SELECTIVELY APPLIED ORTHOGONALITY CORRECTIONS, by Salvestro; and U.S. patent application Ser. No. 12/397,403 (now U.S. Publication No. 2010/0225976), filed Mar. 4, 2009, entitled IMPROVED ORTHOGONALITY CORRECTIONS FOR DIFFERENT SCANNING DIRECTIONS, by Salvestro, the disclosures of which are incorporated herein.

FIELD OF THE INVENTION

The present invention is related to improved orthogonality correction techniques employed in skewed printing systems. In particular, various embodiments of the present invention relate to correcting distortions arising during the printing of graphical elements and electrical components on a printable surface.

BACKGROUND OF THE INVENTION

Various printing technologies have been extensively employed to form graphical elements on various substrates. For example, some printing methods (e.g. ink-jet printing) print various graphical elements by directing image forming fluids towards a printable surface. Some printing methods utilize transfer surfaces to apply colorants to a printable surface to form a graphical element thereon. The printable surface can form part of a printed substrate (e.g. paper or polymeric film) or can form part of an intermediate component adapted to transfer the colorant from the printable surface to the printed substrate (e.g. a blanket cylinder on a press). In either case, a colorant pattern is transferred to the printed substrate to form an image thereon. Various media including printing elements such as printing plates, printing sleeves, printing cylinders and the like include transfer surfaces. Transfer surfaces are used in various printing processes which can include, but are not limited to, offset, waterless offset, flexographic, gravure processes, or variations thereof.

The ability of these and other printing techniques to produce relatively low cost graphical images has lead to considerable interest in the field of printable electronics. This interest is particularly relevant in electronics, display, and energy industries which require the formation of various patterns of conductive, semi-conductive, and/or dielectric materials to form various functional entities including electronic circuits. The functional entities can include conductors, resistors, inductors, capacitors, rectifiers, transistors, opto-electronic devices, microwave devices, or acoustical devices by way of non-limiting example. Printing techniques are being considered to address the various needs of these industries. For example, some printing techniques have the potential to address the relatively large size requirements and low cost demands of various photovoltaic power assemblies. Additionally, various printing techniques are considered well suited for transferring patterns to flexible substrates which increases their potential for use in flexible display applications.

There is also a demand to combine printed graphical images with printed electronics. For example, there is a desire to replace bar-codes in packaging applications with more readily readable RFIDs. There is desire to create "smart packaging" and "smart publications" that can enhance the functionality provided between these articles and the customer. Mechanical, chemical, electrical or electronically-driven functions can enhance the desirability, usability or effectiveness of these articles in some way. Examples can include time or temperature sensitive food quality labels, self-heating or self-cooling containers for beverages and foods, or articles with electronic displays displaying select information based on a particular customer's desire. Accordingly, there is a desire that these articles be formed with printing techniques that can print in addition to various graphical elements, electronic circuits comprising various passive and active components including conductors, resistors, inductors, capacitors, transistors, displays, sensors, batteries, microphones, and the like.

Typically, some media undergo various processes to render their transfer surfaces in a suitable configuration for use in a printing process. These processes can include various image forming processes. For example, exposure processes are used to form images on a surface of media that has been suitably treated so as to be sensitive to light or heat radiation. One type of exposure-based image forming process employs film masks. Specialized recording apparatus can also be employed to directly form images on a surface of the media.

Image forming processes can include various scanning techniques to form various sub-images that are combined to form a desired image. For example, scanning can include establishing relative movement between a recording head and media as the recording channels of the recording head are activated to form corresponding image pixels on the media. A raster line or image pixel column comprising a series of image pixels is formed along a scan direction by a given recording channel as relative movement between the given recording channel and the media is established. Relative movement can include moving one or both of the recording channels and the media. The various raster lines of image pixels combine to form an image swath. In this manner various image portions are formed in corresponding image swaths. In some cases, scanning can be performed while deflecting radiation beams emitted by recording channels relative to media.

Recording apparatus known as computer-to-plate systems have been developed to form images on media. These recording apparatus can include various configurations including external drum, internal drum, and flat-bed configurations. The names of these different configurations typically refer to a configuration of a media support onto which media is positioned while forming images thereon. For example, an external drum recording system includes a cylindrical or drum-like media support onto which media is positioned while forming images thereon. Images are typically formed as the drum rotates about a rotation axis along a circumferential or main-scan direction while a recording head is moved along a sub-scan direction which is generally parallel to the rotation axis. Images are typically formed on the media by helical scanning techniques in which the movement of both the drum and the recording head are controlled to cause imaging beams emitted by the recording head to be scanned over the media along a spiral or helical path. Various external drum recording systems employing helical scanning techniques are examples of skewed recording systems. Skewed recording systems typically scan along a direction that is skewed relative to a desired orientation of an image to be formed during the scanning.

Various image distortions can arise when skewed recording systems are employed to form images. For example, in various external drum recording systems, helical scans are oriented from the main-scan axis by a skew angle determined by the movement of the recording head along the sub-scan axis during each revolution of the drum. Consequently, desired orthogonality characteristics of a rectangular shaped image can be adversely impacted as helical scanning causes the formed image to take a parallelogram shape.

Various techniques have been employed in the art to correct for orthogonality distortions. For example, U.S. Pat. No. 6,081,316 (Okamura et al.) describes a technique to correct for distortions caused by helical scanning in which image data is pre-distorted to compensate for the skewed imaging. In particular, an array of image data is shifted in a memory in an opposite direction to the helical scans to arrange the image data into an array having an "oppositely inclined" parallelogram structure. This pre-distorted image data compensates for the helical scanning to produce an image that substantially maintains the desired orthogonality requirements. Other orthogonality correction techniques include reading out image data along a read path running through the image data file at an angle corresponding to the helical scan angle. Adjustments made to an image data file undergoing orthogonality correction can include the addition of "zero" image data that does not lead to the formation of marked regions on the media but is used to pad the image data file in select regions. Typically, zero image data padding can be applied at the beginning and the end of an orthogonality corrected file. Orthogonality correction techniques are taught in U.S. Pat. No. 7,330,202 (Schweger et al.) in European Patent Application No. 1 211 882.

FIGS. 1A and 1B show various conventionally formed skewed image swaths comparing imaged features which have selectively undergone orthogonality correction during their formation. In particular, FIG. 1A shows a typical helically formed image swath 100A formed while not employing orthogonality correction techniques while FIG. 1B shows a typical helically formed image swath 100B that is formed while employing a conventional orthogonality technique. Both image swaths 100A and 100B are shown skewed with respect to main-scan axis MSA by a helical scan angle θ. For clarity, both image swaths 100A and 100B are shown in an unwound or "flat" orientation. It is understood that each of image swaths 100A and 100B would helically wrap around the media support if formed in an external drum recording apparatus. Image swath 100A includes an image feature 47A that extends along the length of the swath. Although it is desired that image feature 47A extend along a direction that is parallel to a main-scan axis MSA, helical scanning techniques cause image feature 47A to assume a skewed orientation with respect to main-scan axis MSA. This skewed orientation is corrected in FIG. 1B. In this case, although image swath 100B is also shown in a skewed orientation with main-scan axis MSA (i.e. in the same orientation as non-corrected image swath 100A), the employed orthogonality correction technique caused image feature 47B to be formed with a desired orientation (i.e. shown as a broken line 13) that is substantially parallel to main-scan axis MSA.

Analysis of FIG. 1B shows that one effect of the employed orthogonality correction technique is that image feature 47B is formed from a plurality of image feature portions 48 (i.e. image feature portions 48B in this case) that are arranged in a "stair-case" fashion. In this case, portions of image data have been read out along various skewed read paths that correspond to helical scan angle θ. The image data in each of the skewed read paths results in stair-case appearance of image feature 47B.

In many graphics-based applications, stair-cased image feature 47B would typically be perceived by the unaided human eye to appear to extend along direction of broken line 13 essentially in an un-interrupted fashion thereby rendering the employed orthogonality correction technique acceptable. There are exceptions, however, where stair-case image feature 47B would be noticeable to the un-aided human eye and would be considered objectionable. For example, in some lenticular applications, visible artifacts may be visible at the boundaries of the lenticular lenses. In some cases the lenticular lenses act as magnifying elements that make the stair-case effect more pronounced. In some applications, the formation of various security features (e.g. security strips) on various documents including currency would likely not be acceptable if these security features were formed with a staircase arrangement of image feature portions.

The functionality of the various printed electronic elements is of paramount importance in the field of printed electronics. Deviations in the conductive, dielectric or semiconductive properties of the printed electronic elements can adversely impact the functionality of the electronics that they are incorporated into. For example, if image feature 47B corresponds to a printed conductive trace, very high areas of electrical resistance would be encountered at various staircase shifts points associated with the employed orthogonality correction technique. This problem becomes especially pronounced as the demand for thinner conductors on the order of one or two pixels wide increases. Other electronic elements corresponding to orthogonality corrected image features similar to image feature 47B can suffer from similar problems.

There is a desire for improved orthogonality correction techniques that reduce the occurrence of functionality problems that can arise during the printing of electronic components.

There is a desire for improved orthogonality correction techniques that can combine electronic and graphical elements on a printed article with reduced occurrences of functionality problems and/or visual artifacts.

SUMMARY OF THE INVENTION

Briefly, according to one aspect of the present invention a method for forming an image in a skewed recording apparatus comprising a recording head comprising a plurality of recording channels, the method includes providing an image data file comprising a plurality of image data columns; assigning different portions of each image data column to different recording channels; substituting first image data from a first image data column assigned to a first recording channel with second image data from a second image data column assigned to a second recording channel; and operating the recording head to form the image.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive sense.

Figure 2:
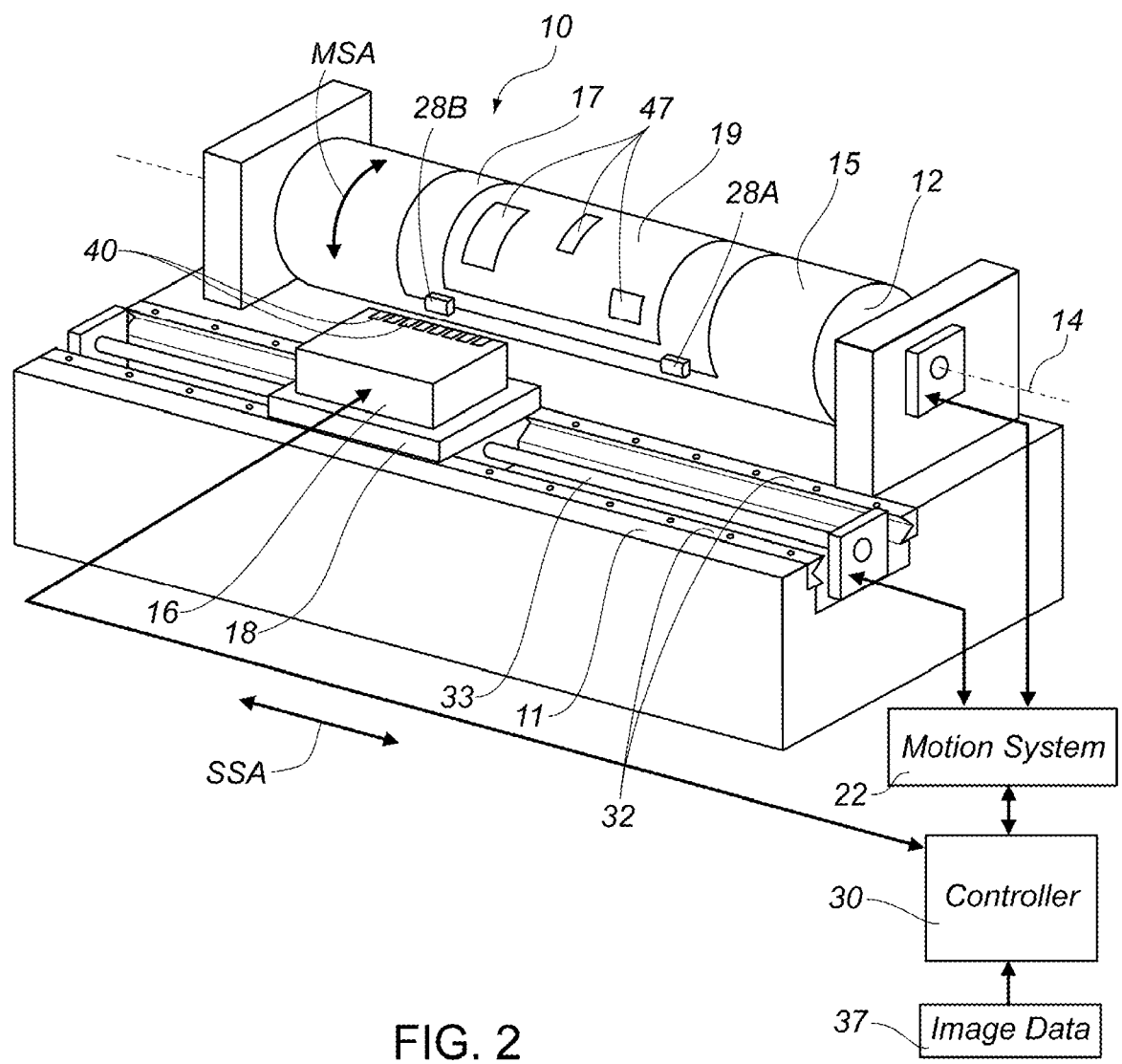
FIG. 2 shows a partial schematic view of a recording apparatus employed in an example embodiment of the invention.

FIG. 2 schematically shows a recording apparatus 10 for forming an image 19 on media 17 as per an example embodiment of the invention. Media 17 can take various forms including by way of example, various recording media including printing elements such as printing plates, printing sleeves, printing cylinders and other substrates comprising suitable surfaces for forming images thereon.

Recording apparatus 10 includes a media support 12, which in this example embodiment is arranged according to an external drum configuration. Accordingly in this example embodiment, media support 12 comprises a drum-like or cylindrical shape adapted to rotate about a rotation axis 14. Other examples embodiments of the invention can include other forms of media supports which can include internal drum configurations or flat surface configurations.

Media 17 is supported on a cylindrical surface 15 of media support 12. One or more portions of media 17 are secured to cylindrical surface 15 by clamping members 28A and 28B. Other example embodiments of the invention can secure media 17 to media support 12 by additional or alternative methods. For example, a surface of media 17 can be secured to cylindrical surface 15 by various methods including providing a low pressure source (e.g. suction) between the surfaces. In other example embodiments, media 17 can take the form of a hollow sleeve-like structure (e.g. a printing sleeve) that is positioned over and held onto media support 12 by various methods known in the art. In some example embodiments, media support 12 and media 17 are combined into a single assembly. Combined media support/media assemblies can take the form of various printing plate cylinders such as gravure cylinders for example.

Recording apparatus 10 includes recording head 16 which is movable relative to media support 12. In this example embodiment of the invention, recording head 16 is mounted on movable carriage 18. Media support 12 rotates about rotation axis 14 relative to support 11. Carriage 18 is movable relative to support 11 in a manner in which recording head 16 can be moved along a path substantially aligned with rotation axis 14. Motion system 22 is used to provide relative movement between recording head 16 and media support 12. Motion system 22 (which can include one or more motion systems) includes any suitable drives, encoders, and sensors needed for the required movement. In this example embodiment of the invention, motion system 22 is used to rotationally move media support 12 along a path aligned with a main-scan axis MSA and to move recording head 16 along a path aligned with sub-scan axis SSA. Guide system 32 is used to guide carriage 18 which is moved under the influence of transmission member 33. In this example embodiment of the invention, transmission member 33 includes a screw that moves carriage 18 as the screw rotates.

Those skilled in the art will realize that various forms of relative movement between recording head 16 and media support 12 are possible. For example, in some cases both recording head 16 and media support 12 are moved at the same time. In some cases recording head 16 can be stationary while media support 12 is moved. In other cases, media support 12 is stationary and recording head 16 is moved. In some cases, one or both of recording head 16 and media support 12 can be controlled to move along opposite directions in each of their respective paths of movement. In some cases, one or both recording head 16 and media support 12 can be controlled to move in a reciprocating fashion as in a flat-bed recording apparatus for example. Separate motion systems 22 can also be used to operate different systems within recording apparatus 10.

Controller 30, which can include one or more controllers is used to control one or more systems of recording apparatus 10 including, but not limited to, various motion systems 22 used by media support 12 and carriage 18. Controller 30 can also control media handling mechanisms that can initiate the loading and unloading of media 17 to and from media support 12. Controller 30 can also provide image data 37 to recording head 16 and control recording head 16 to form images in accordance with this data. Various systems can be controlled using various control signals and by implementing various methods. Controller 30 can be configured to execute suitable software and can include one or more data processors, together with suitable hardware, including by way of non-limiting example: accessible memory, logic circuitry, drivers, amplifiers, A/D and D/A converters, input/output ports and the like. Controller 30 can comprise, without limitation, a microprocessor, a computer-on-a-chip, the CPU of a computer or any other suitable microcontroller.

In this example embodiment, recording head 16 includes plurality of recording channels 40. The plurality of recording channels 40 can be arranged in various configurations including various array configurations. An array of recording channels 40 can include a one-dimensional or a two-dimensional array of the recording channels. Each recording channel 40 is individually controllable an image pixel 45 (not shown in FIG. 2) on media 17 in accordance with specific image information provided by image data 37. As used herein, image pixel 45 refers to a single unit element of image that can be formed on media 17. In the present invention, various image pixels 45 will be combined with other image pixels 45 to form various image features 47. Image pixels 45 can be combined with one another to form various patterns of image pixels 45 including halftone patterns, stochastic patterns and hybrid patterns (i.e. patterns that include halftone and stochastic patterns) that can used in the formation of various image features 47 especially when the image features 47 correspond to graphical elements.

Recording channels 40 can be controlled to form images on media 17 by different methods. For example, in various inkjet applications, recording channels 40 can include various nozzle structures that are operable for emitting drops of image forming material onto an imageable surface. Each drop that is transferred to the imageable surface can be used in the formation of an image pixel 45. Image forming materials can include colorants, dye based compositions, pigment based compositions, photo-sensitive compositions and thermo-sensitive compositions by way of non-limiting example. In this illustrated embodiment, recording channels 40 are controlled to emit radiation beams (not shown) to form corresponding image pixels 45. Radiation beams can be emitted by various methods. For example, in this illustrated embodiment recording head 16 includes a radiation source such as a laser (not shown) which directs radiation onto a spatial light modulator (also not shown). The channels of the spatial light modulator are selectively controlled to transform the radiation into a plurality of radiation beams. Various optical elements (not shown) project the radiation beams onto media 17 to form corresponding image pixels 45.

Radiation beams can be used to form image 19 on media 17 by different methods. For example, radiation beams can be used to image-wise ablate a surface of media 17. Radiation beams can be used to cause an image-wise transference of an image-forming material from a donor element to a surface of media 17 (e.g. a thermal transfer process). Media 17 can include an image modifiable surface, wherein a property or characteristic of the modifiable surface is changed when irradiated by a radiation beam emitted by a recording channel 40. A radiation beam can undergo a direct path from a radiation source to media 17 or can be deflected by one or more optical elements towards the media.

Once an image 19 is formed, media 17 can undergo additional processing steps. For example, many types of media 17 undergo various chemical processing steps to amplify a difference between imaged and non-imaged portions of the media. Additional processing steps can also include drying steps, gumming steps and steps that involve the formation of registration features on the media 17. The choice of processing steps employed is typically motivated by the type of media 17 that is processed.

In many cases, the number of recording channels 40 is insufficient to completely form image 19 during a single image forming operation. Accordingly, image 19 is formed by merging multiple sub-images together, each of the sub images being formed during a corresponding image forming operation. Sub-images can be formed in different manners. In various example embodiments of the invention, each sub-image is formed during a scanning operation in which an image swath is formed. In various example embodiments of the invention, helical scanning techniques are employed. In this example embodiment, helical image swaths can be formed when controller 30 causes recording head 16 to emit radiation beams while simultaneously moving recording head 16 along a direction of sub-scan axis SSA and media support 12 along a direction of main-scan axis MSA. As previously described, helical scanning techniques can lead to various geometric distortions. It is to be understood, however that skewed scanning techniques such as helical scanning are not limited to external drum configurations but can also happen with other configurations of recording apparatus. For example, in some internal drum image forming apparatus, media is positioned on a concave surface of a media support while a radiation beam is directed towards an optical deflector positioned along a central axis of the media support. The optical deflector is rotated while moving along central axis to cause the radiation beam to follow a spiral path on the surface of the media.

Figure 3:
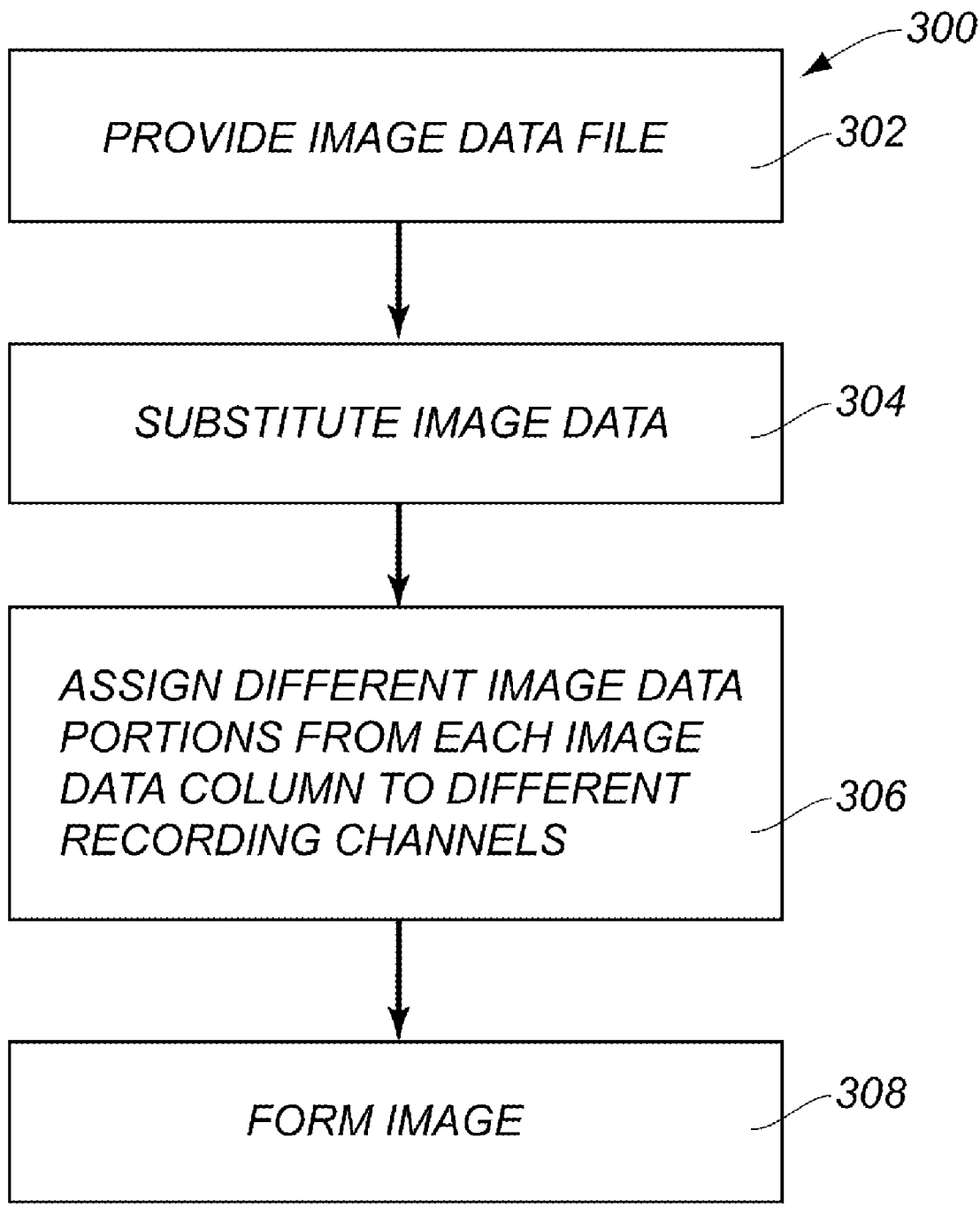
FIG. 3 shows a flow chart representative of a method performed as per an example embodiment of the invention.

FIG. 3 shows a flow chart representing a method 300 as per an example embodiment of the invention. Although, the illustrated method refers to recording apparatus 10, it is to be understood that other suitable image forming apparatus can just as readily be used in various embodiments of the invention.

Figure 4A:
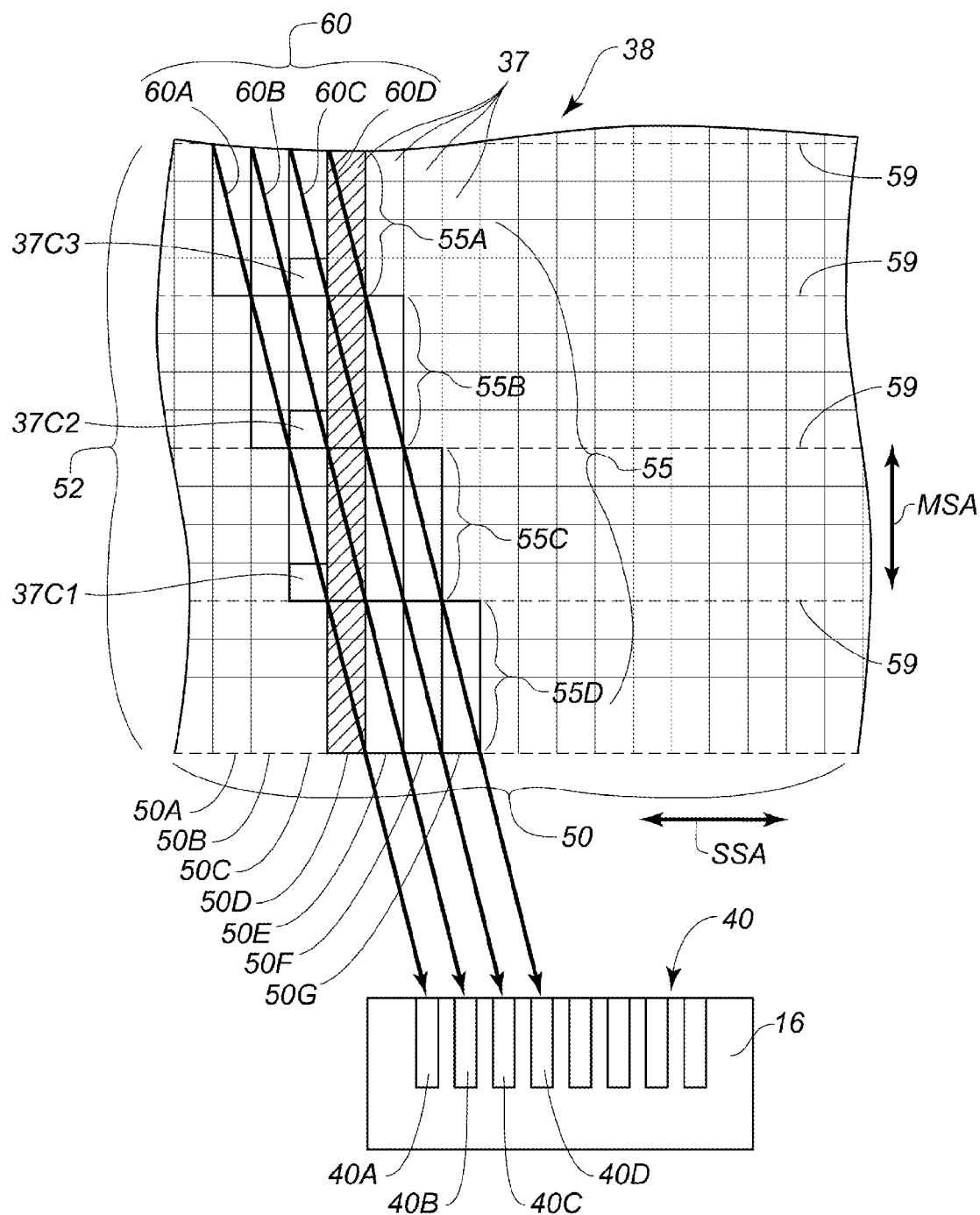
FIG. 4A schematically shows an image data file representative of an image to be formed in a skewed recording apparatus.

In step 302 an image data file 38 is provided. In this example embodiment, image data file 38 has not yet undergone orthogonality corrections and is thus referred to as un-orthogonalized image data file 38. FIG. 4A schematically shows image data 37 representative of an image 19 arranged in a portion of image data file 38. FIG. 4A additionally schematically represents an assignment of various image data 37 to various ones of recording channels 40 in recording head 16. In this example embodiment, image data file 38 includes matrix in which image data 37 is arranged in image data columns 50 and image data rows 52. In this example embodiment, image data columns 50 include image data columns 50A, 50B, 50C, 50D, 50E, 50F, and 50G. In some example embodiments, image data file 38 is a raster bitmap. In this example embodiment, each bit of image data 37 is represented by a cell in the matrix. Each cell corresponds to an image pixel 45 that can be formed on media 17 by a recording channel 40. In this example embodiment, each image data column 50 corresponds to a desired arrangement of image pixels 45 along a direction of main-scan axis MSA (e.g. a raster line) while each image data row 52 corresponds to an arrangement of image pixels 45 along a direction of sub-scan axis SSA. In this example embodiment, image data file 38 includes various "non-zero" image data 37 (i.e. patterned for clarity) which include information that when assigned to recording head 16, causes recording head 16 to form "non-zero" image pixels 45 that include marked regions on media 17. In this example embodiment, image data 37 in image data column 50D is similar in form to the image data employed during the formation of previously described image feature 47B (i.e. a column of image data 37 that is one bit in width).

Figure 1A:
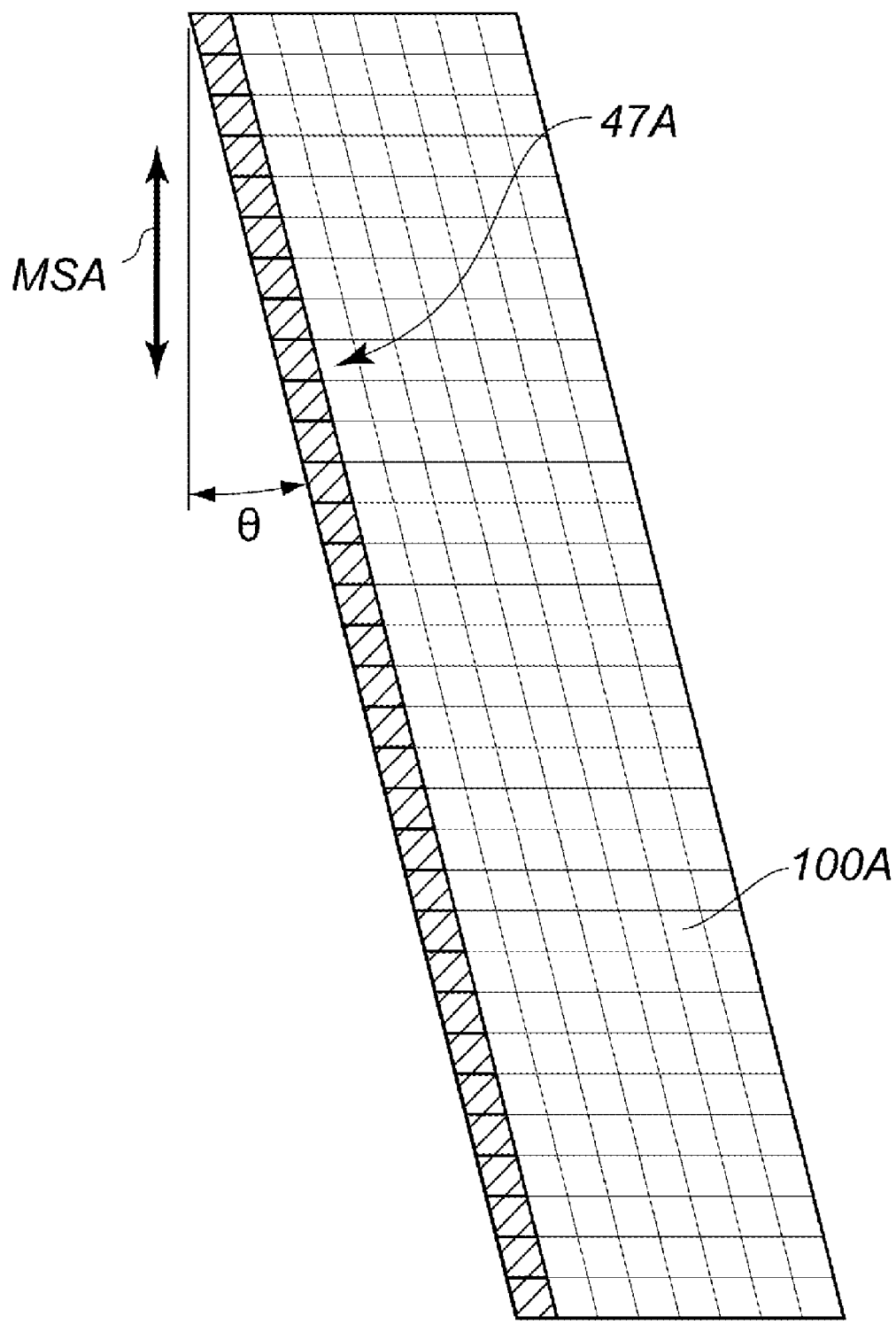
FIG. 1A shows an image feature formed in a conventional helical image swath.

As previously stated, orthogonality distortions can occur when an un-orthogonalized image data file 38 is employed while forming an image in a skewed recording apparatus, and such distortions are typically corrected by one of a number of orthogonality correction techniques. In this example embodiment, orthogonality corrections are made by reading skewed image data columns 60 to recording head 16 to compensate for distortions created by the helical scanning. That is, rather than reading out an entire image data column 50 to a given recording channel 40 which would result in the formation of a skewed image feature 47 such as that shown in FIG. 1A, different image data portions 55 from each of a plurality of image data columns 50 are assigned to different recording channels 40 via a skewed image data column 60. For clarity, each skewed image data column 60 is schematically represented by as a bolded arrow incorporating different image data portions 55 corresponding to that particular skewed image data column 60. For example, skewed image data column 60D is shown including image data portions 55A, 55B, 55C, and 55D.

In this example embodiment, each image data portion 55 assigned to a given skewed image data column 60 is selected from a different image data column 50. Each skewed image data column 60 is schematically shown assigned to particular recording channel 40 of recording head 16 (i.e. each skewed image data columns 60A, 60B, 60C, and 60D is assigned to corresponding one of recording channels 40A, 40B, 40C, and 40D). Although only four (4) skewed image data columns 60A, 60B, 60C, and 60D are shown for clarity, it is understood that other skewed image data columns 60 can also be generated. In some example embodiments, the number of skewed image data columns 60 that is read out is motivated by the number of recording channels 40 that are to be employed during a particular scan. In this example embodiment, various image portions 55 transition from one to another in a given skewed image data column 60 at locations on image data shift lines 59 which are schematically represented by broken lines.

In this example embodiment, image data 37 in each skewed image data column 60 is read out along a direction that is skewed with respect to an arrangement direction of the image data 37 within image data columns 50. In this example embodiment, each image data portion 55 is sized to cause associated skewed image data columns 60 to compensate for orthogonality distortion effects associated with the helical scanning. In this example embodiment, each image data portion 55 is sized in accordance with a helical scan angle θ associated with recording apparatus 10. In some example embodiments, media 17 can be located on media support 12 such that an edge of media 17 is skewed with respect to sub-scan axis SSA. In these embodiments, each image data portion 55 can be sized to correspond to both the helical scan angle θ and the skew associated with the placement of the recording media edge to thereby compensate for both these effects.

In this example of the invention, each image data portion 55 is sized based at least on the number of recording channels 40 that are to be employed during the formation of a given image swath, various resolutions of image pixels 40 to be formed on media 17, and an applicable main-scan distance associated with each image swath to be formed. In this example embodiment, the applicable main-scan distance corresponds to a circumferential distance associated with cylindrical surface 15 and a thickness of recording media 17.

Figure 1B:
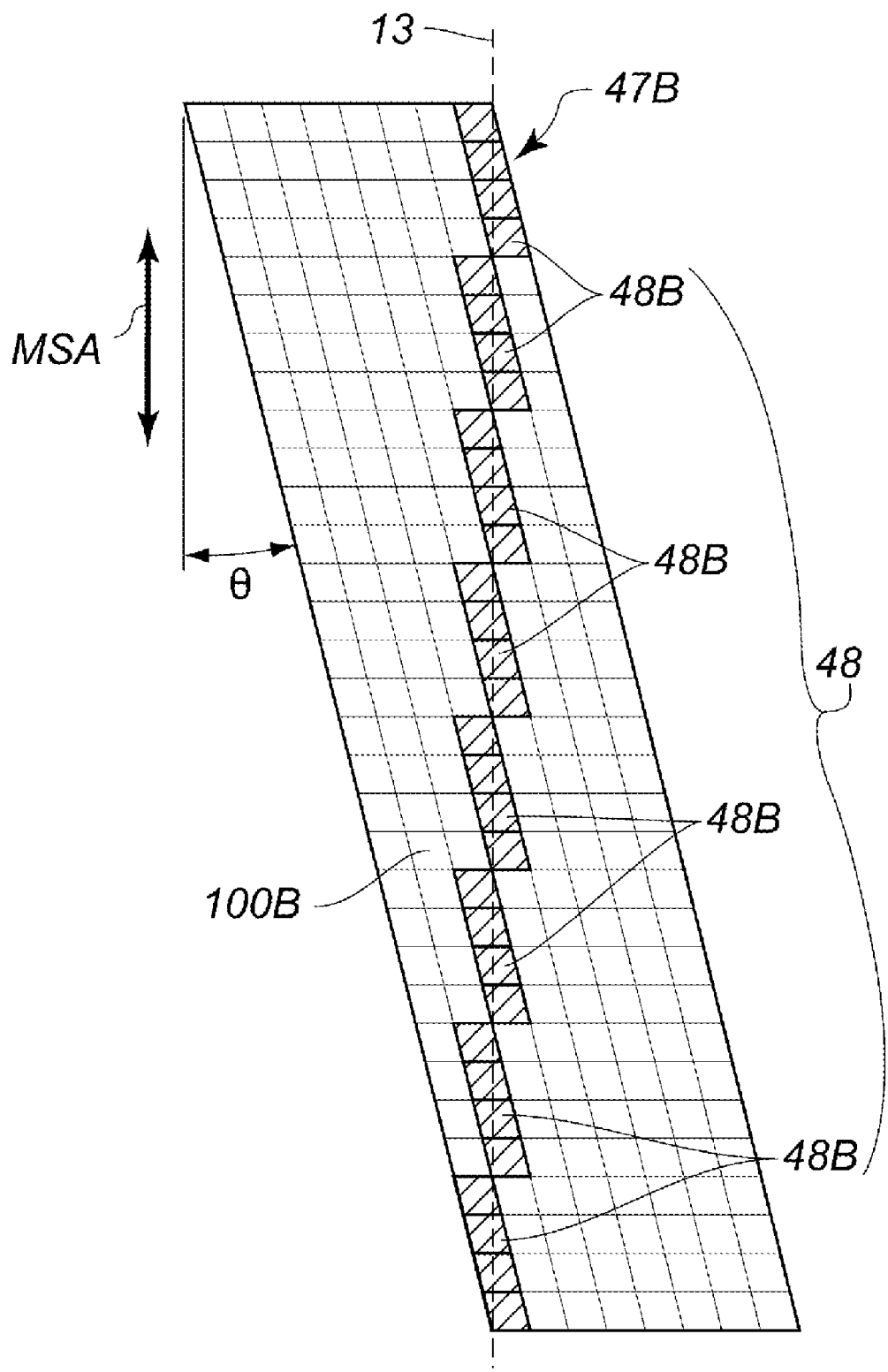
FIG. 1B shows the image feature of FIG. 1A formed with a conventional orthogonality correction technique.

In this example embodiment, some of the image data portions 55 corresponds to various image feature portions 48 that are similar to the image feature portions 48B shown in FIG. 1B. In this example embodiment, each image feature portion 48 is formed by a different recording channel 40 in accordance with an image data portion 55 assigned to that particular recording channel 40. Accordingly, different image data portions 55 within each of the image data columns 50 are assigned to different recording channels 40 in the employed process.

Image features 47 can include graphical features that correspond to various pictorial and/or textual elements. Until recently, typical printing operations dealt primarily with graphical features, and the quality of the final printed image was typically dependant on various characteristics such as color, hue, moiré, etc. Consequently, the use of conventional orthogonality correction techniques during the formation of typical graphical features in skewed recording systems was acceptable since stair-case edges of the formed features were seldom visible to the unaided human eye. However, with the increased interest in the field of printable electronics, image features 47 comprising functional characteristics instead of, or in addition to, visual characteristics require additional consideration. For example, if an image feature such as previously described image feature 47B corresponds to an electrical conductor, undesired high resistances would be associated at locations where one image feature portion 48B transitions to an adjacent image feature portion 48B. This problem becomes especially pronounced with the increased desire to employ thinner conductors on the order of one or two pixels wide. Other forms of electronic elements can suffer from similar problems when conventional orthogonality techniques are employed.

Functional problems can be corrected in various example embodiments of the present invention. In this example embodiment, image data 37 within a first image data column 50 is substituted with image data 37 from another image data column 50 in step 304. In the example embodiment as shown in FIG. 4A various image data 37 including first image data 37C1, 37C2, and 37C3 in a first image data column 50C is selected for substitution. In this example embodiment, each of first image data 37C1, 37C2, and 37C3 comprises information which if assigned to a given recording channel 40, would cause that recording channel 40 to form a corresponding "zero" image pixel 45 which includes an unmarked region of media 17. Accordingly, each of first image data 37C1, 37C2, and 37C3 is shown un-patterned in FIG. 4A.

Figure 4B:
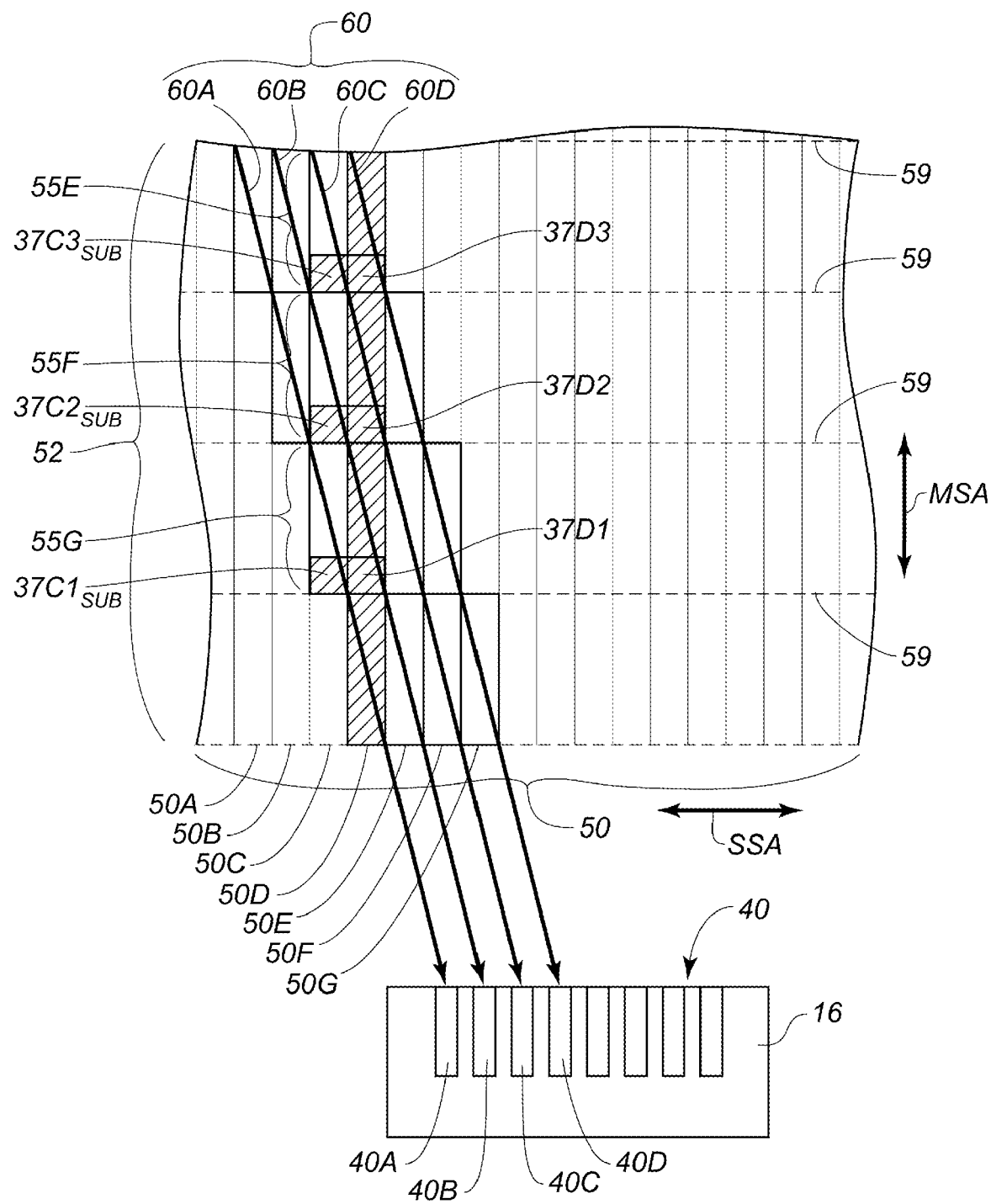
FIG. 4B schematically shows the image data file of FIG. 4A wherein various image data within the image data file is substituted with other image data in the image data file as per an example embodiment of the invention.

As shown in FIG. 4B, first image data 37C1 is substituted with second image data 37D1 from a second image data column 50D to form substituted first image data $37C1_{SUB}$. In this example embodiment, second image data column 50D is adjacent to first image data column 50C. In this example embodiment, first image data 37C1 is substituted with image data 37 that comprises information which if assigned to a given recording channel 40, would cause that recording channel 40 to form a corresponding non-zero image pixel 45 on media 17. Accordingly, substituted first image data $37C1_{SUB}$ is shown patterned in FIG. 4B in accordance with "non-zero" image data information. In a similar process, first image data 37C2 and 37C3 in first image data column 50C are each respectively substituted with second image data 37D2 and 37D3 to respectively form substituted first image data $37C2_{SUB}$ and $37C3_{SUB}$. In this example embodiment, image data 37 is substituted in locations proximate the image data shift lines 59.

In step 306 different image data portions 55 from each image data column 50 are assigned to different recording channels 40. In this example embodiment, these assignments are performed with image data portions 55 selected from each of image data columns 50A, 50B, 50C, 50D, 50E, 50F, and 50G. In this example embodiment, each image data portion 55 is assigned to particular recording channel 40 in accordance with the particular skewed image data column 60 to which that image data portion 55 belongs. In this example embodiment, some of the image data portions 55 include image data 37 that was substituted with image data 37 from another image data portion 55. As shown in FIG. 4B, a portion of the image data 37 in image data portions 55E, 55F, and 55G includes substituted image data 37.

Figure 5A:
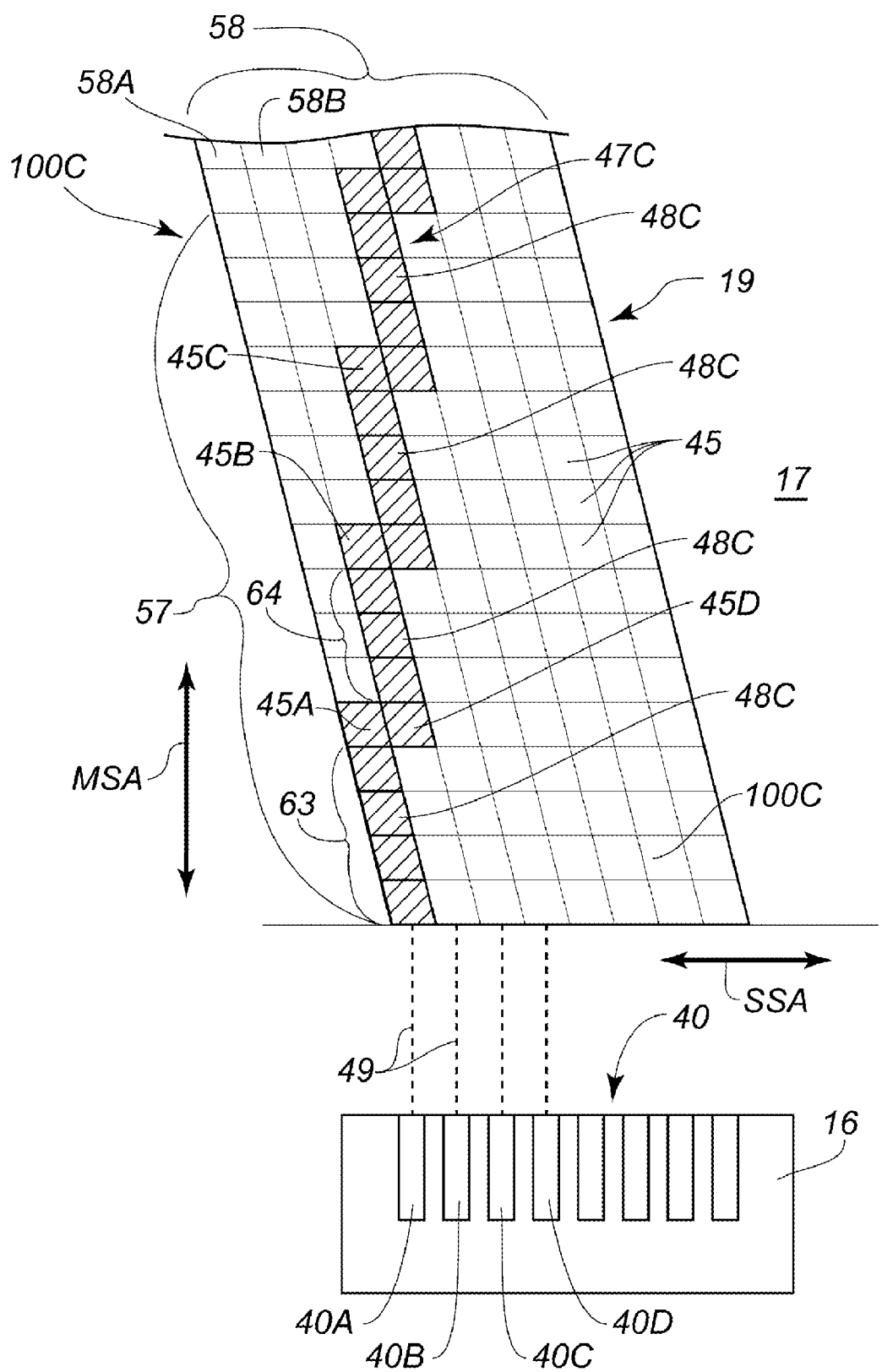
FIG. 5A shows an image feature formed on media in accordance with the modified image data file shown in FIG. 4B.

In step 308, recording head 16 is operated to form image 19. FIG. 5A shows a portion of an image 19 formed in step 308. As previously stated, recording apparatus 10 is operated to scan media 17 in a skewed orientation relative to main-scan axis MSA. In this regard, recording head 16 is operable for forming an image pixel matrix comprising a plurality of image pixel rows 57 and a plurality of image pixel columns 58. In this example embodiment, image pixel columns 58 are skewed relative to main-scan axis MSA by a skew angle corresponding to the helical scan angle θ. In this example embodiment the portion of image 19 is formed in an image swath 100C. The illustrated portion of image 19 is shown in a "flat" orientation for clarity and the formation of each image pixel columns 58 by respective imaging channels 40 is schematically represented by broken lines 49.

In this example embodiment, the portion of image 19 was formed by recording head 16 in accordance with information provided, at least in part, by each of skewed image data columns 60A, 60B, 60C, and 60D which are respectively assigned to recording channels 40A, 40B, 40C, and 40D. Image 19 includes an image feature 47C that is similar to previously described image feature 47B. In particular, image feature 47C is formed from a plurality of image feature portions 48C that were each formed by a different recording channel 40 of recording head 16. Image feature 47C is also oriented substantially parallel to main-scan axis MSA as desired. Image pixels 45 in each image pixel column 58 are formed in accordance with the skewed image data column 60 assigned to a given recording channel 40 that is operated to form that particular image pixel column 58. Consequently, each image pixel column 58 is formed in accordance with a plurality of image data portions 55, wherein each image data portion 55 is selected from a different image data column 50.

In a manner similar to that employed during the formation of image feature 47B, parts of image feature 47C are formed by assigning a first portion of image data 37 from a first one of the image data columns 50 (e.g. image data column 50D) to a first recording channel 40 (e.g. recording channel 40A) to form a first group of one or more image pixels 45 (e.g. first image pixel group 63) in a first image pixel column 58A. A second portion of the image data 37 from the first one of the image data columns 50 (i.e. image data column 50D) is assigned to a second recording channel 40 (e.g. recording channel 40B) to form a second group of one or more image pixels 45 (e.g. second image pixel group 64) in a second image pixel column 58B in a similar manner.

There are, however, important differences between conventionally formed image feature 47B and image feature 47C as formed per this example embodiment of the invention. In this example embodiment of the invention a third portion of the image data 37 from the first one of the image data columns 50 (i.e. image data column 50D) is assigned to each of the first recording channel 40A and the second recording channel 40B to form a third group of one or more image pixels 45 in each of the first image pixel column 58A and the second image pixel column 58B. In this example embodiment, the third group of one or more image pixels comprises a single pixel. As shown in FIG. 5A image pixels 45A and 45D are respectively formed in each of the first image pixel column 58A and the second image pixel column 58B at locations between image pixel groups 63 and 64.

This example embodiment results in the formation of image feature portions 48C which each comprise an additional image pixel 45 than do corresponding image feature portions 48B which make up conventionally formed image feature 47B. In this example embodiment, image pixels 45 including image pixels 45A, 45B, and 45C are additionally formed. In this example embodiment, image pixels 45A, 45B, and 45C correspond respectively with substituted first image data $37C1_{SUB}$, $37C2_{SUB}$, and $37C3_{SUB}$. In this example embodiment, each of the additionally formed image pixels 45 in each image feature portion 48C is formed at a location that is next to the location of an image pixel 45 in an adjacent image feature portion 48C (i.e. image pixels 45A and 45D for example). In this example embodiment, each of image pixels 45A, 45B, and 45C are formed in the same image pixel rows 57 that contain the corresponding image pixels 45 that were formed from the particular image data 37 that was substituted into first image data 37C1, 37C2, and 37C3. For example, substituted first image data $37C1_{SUB}$ was formed by substituting first image data 37C1 with first image data 37D1. Substituted first image data $37C1_{SUB}$ was assigned to recording channel 40A which was operated to form image pixel 45A in the same image pixel row 57 as a corresponding image pixel 45D which was formed by recording channel 40B in accordance with image data 37D1 which was assigned recording channel 40B. In this example embodiment, image pixels 45A and 45D are adjacent image pixels. In this example embodiment, each of image pixels 45A and 45D are each respectively formed in accordance with image data 37 that was originally provided in a single image data column 50.

Those skilled in the art will now realize that other image pixels 45 can be formed in a particular image pixel column 58 corresponding to each of the additionally formed image pixels 45A, 45B, and 45C. In some example embodiments, these other image pixels 45 can be formed in accordance with image data 37 selected from an image data column 50 other than the particular image data column 50 into which image data 37 is substituted. In some example embodiments, these other image pixels 45 are formed from image data 37 selected from a third image data column 50 that is different from the image data column 50 into which image data 37 is substituted and the image data column 50 from which image data 37 is substituted from. In the example embodiment of the invention shown in FIG. 5A, other image pixels 45 are formed in accordance with an image data column 50 from which image data 37 was substituted from. For example, image pixel 45A which was formed in accordance with substituted image data and the image pixels 45 in first image pixel group 63 were all formed in accordance with image data 37 that was originally present in a same image data column 50 (i.e. image data column 50D). In this example embodiment, image pixel 45A and the image pixels 45 in first image pixel group 63 are all formed in accordance with a continuous sequence of image data 37 from a single image data column 50.

In this example embodiment, image pixels 45A, 45B, and 45C have been additionally formed to improve a functional characteristic associated with image feature 47C. In this example embodiment, image feature 47C corresponds to an electrical element, or more particularly, to an electrical conductor. In some example embodiments, media 17 is a printing plate adapted to transfer a functional material to a substrate in an image-wise fashion. Functional materials can include materials having conductive properties or dielectric properties, for example. In this example embodiment, the addition of recording channels 40A, 40B, and 40C has reduced the potential for high electrical resistances forming at the transition points between adjacent image feature portions 48 that arise as a consequence of the employed orthogonality corrections. As shown in FIG. 5A, image feature 47C extends in substantially un-interrupted fashion along a desired direction that is substantially parallel to main-scan axis MSA. In this example embodiment, image feature 47C advantageously comprises a substantially common width as it extends along a direction of main-scan axis MSA. In this example embodiment of the invention, the image feature 47C comprises a width equal to one (1) image pixel 45. In other example embodiments of the invention, image features 47 can have widths greater than one image pixel wide. In some example embodiments, image pixels formed on the basis of substituted image data 37 (e.g. image pixels 45A, 45B, and 45C) are formed along the edge of an image feature 47.

Figure 5B:
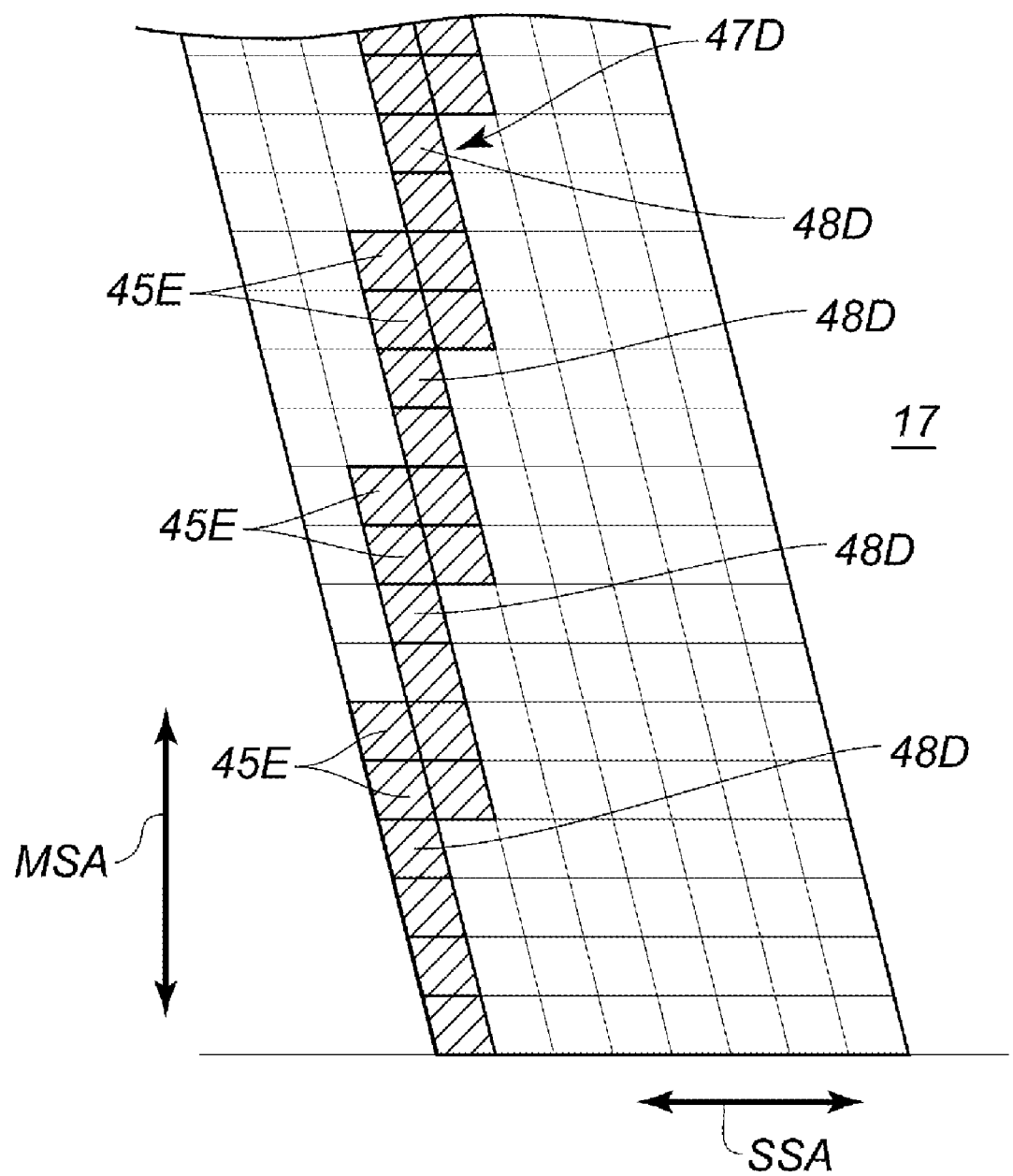
FIG. 5B shows another image feature formed on media as per another example embodiment of the invention.

In the illustrated example embodiment, the substituted image data 37 comprises a single image data bit, although it is understood that different numbers of image data bits can be substituted in other example embodiments. For example, FIG. 5B shows a formed image feature 47D that is similar to previously described image feature 47C. In this example embodiment, image feature 47D includes a plurality of image feature portions 48D. FIG. 5B shows that each image feature portions 48D includes a plurality of formed image pixels 45E that are formed in accordance with substituted image data 37 as per methods similar to other example embodiments that were previously described. As shown in FIG. 5B, each of the plurality of image pixels 45E are formed next to image pixels 45 of an adjacent image feature portion 48D. As shown in FIG. 5B, the incorporation of the plurality of image pixels 45E into each image feature portion 48D increases a region of contact between adjacent image feature portions 48D. Substituting image data to adjusting regions of contact between adjacent image feature portions 48D can be motivated by various factors which can include by way of non-limiting example, adjusting an electrical property (e.g. conductivity) associated with the regions of contact. It is understood that the plurality of image pixels 45E is not limited to two (2) image pixels 45 and other suitable numbers can be employed in other example embodiments of the invention.

The example embodiment of the invention referenced in FIGS. 4A, 4B, and 5A shows that additional image pixels 45 have been formed on the basis of substituted image data 37 arranged on one side of each of the image data shift lines 59. In other example embodiments of the invention, additional image pixels 45 can be formed on the basis of substituted image data 37 arranged on both sides of an image data shift line 59.

In various example embodiments of the invention, various image data 37 can be substituted with other image data 37 on a selective basis. As previously stated, there is an increased interest in combining electrical and graphical elements on printed articles. In some example embodiments, image features 47 corresponding to graphical elements are printed separately from image features 47 corresponding to electrical features. For example, graphical elements can printed with a printing material comprising suitable color characteristics associated with the graphical elements, while electrical elements are printed with a printing material comprising suitable electrical characteristics (e.g. conductive or dielectric properties) associated with the electrical elements. In some example embodiments, an electrical element and a graphical element are printed at different print stations. In some example embodiments, image features 47 corresponding to electrical elements are formed on different media 17 than the media that image features 47 corresponding to graphical elements are formed on.

In some example embodiments, image features 47 corresponding to electrical elements are formed on a same media 17 that image features 47 corresponding to graphical elements are formed on. For example, image features 47 corresponding to both electrical elements and graphical elements can be formed on a common media 17 which can include a common printing plate, a common printing sleeve or a common printing cylinder by way of non-limiting example. The common media 17 can be used to apply a functional material comprising an electrical characteristic to form both the graphical elements and the electrical elements. In some example embodiments, the functional material additionally comprises specific color characteristics as required by the graphical elements. In some example embodiments, image features 47 corresponding to electrical elements can include graphical attributes as may be required in some applications. In some example embodiments, image features 47 corresponding to both electrical elements and graphical elements are formed on a common surface of media 17.

In some example embodiments, first image data 37 from a first image data column 50 that has been assigned to a first recording channel 40 is substituted with second image data 37 from a second image data column 50 that has been assigned to a second recording channel 40 on the basis of the type of image feature 47 that is to be formed. For example, some example embodiments of the invention can include determining if the image feature 47 corresponds to an electrical element or a graphical element, and substituting the first image data 37 with the second image data 37 in the event that the image feature 47 is determined to correspond to an electrical element. In some example embodiments, first image data 37 is not substituted with the second image data 37 in the event that the image feature 47 is determined to correspond to a graphical element.

Various example embodiments of the present invention provide improved orthogonality correction methods in which image data 37 is read out along skewed image data columns 60. The present invention is not limited to these embodiments and those skilled in the art will now realize that the present invention can easily be adapted for use with other orthogonality correction techniques. By way of non-limiting example, other orthogonality correction techniques can include shifting image data 37 in the un-orthogonalized image file 38 in a computer-readable memory, such that the shifts in the image data 37 are made based at least on the skew angle associated with the skewed printing system. Shifts are typically made in a direction opposite to an arrangement direction of the un-orthogonalized image data file 38 that corresponds to sub-scan direction along which recording head 16 is conveyed while scanning.

The invention has been described in detail with particular reference to certain preferred embodiments thereof, but it will be understood that variations and modifications can be effected within the scope of the invention.

PARTS LIST 10 recording apparatus
11 support
12 media support
13 broken line
14 rotation axis
15 cylindrical surface
16 recording head
17 media
18 carriage
19 image
22 motion system
28A clamping member
28B clamping member
30 controller
32 guide system
33 transmission member
37 image data
37C1 first image data
37C2 first image data
37C3 first image data
37C1$_{SUB}$ substituted first image data
37C2$_{SUB}$ substituted first image data
37C3$_{SUB}$ substituted first image data
37D1 second image data
37D2 second image data
37D3 second image data
38 image data file
40 recording channel
40A recording channel
40B recording channel
40C recording channel
40D recording channel
45 image pixel
45A image pixel
45B image pixel
45C image pixel
45D image pixel
45E image pixel
47 image features
47A image feature
47B image feature 47C image feature
47D image feature
48 image feature portion
48B image feature portion
48C image feature portion
48D image feature portion
49 broken lines
50 image data column
50A image data column
50B image data column
50C image data column
50D image data column
50E image data column
50F image data column
50G image data column
52 image data row
55 image data portion
55A image data portion
55B image data portion
55C image data portion
55D image data portion
55E image data portion
55F image data portion
55G image data portion
image pixel rows
image pixel columns
58A first image pixel column
58B second image pixel column
59 image data shift line
60 skewed image data column
60A skewed image data column
60B skewed image data column
60C skewed image data column
60D skewed image data column
63 first image pixel group
64 second image pixel group
100A image swath
100B image swath
100C image swath
300 method
302 provide image data file
304 substitute image data
306 assign different image data portions from each image data column to different recording channels
308 form image
MSA main-scan axis
SSA sub-scan axis
θ helical scan angle

The invention claimed is:

1. A method for forming an image in a skewed recording apparatus comprising a recording head comprising a plurality of recording channels, the method comprising:
providing an image data file comprising a plurality of image data columns;
assigning different portions of each image data column to different recording channels;
substituting first image data from a first image data column assigned to a first recording channel with second image data from a second image data column assigned to a second recording channel;
operating the recording head to form the image; and
comprising substituting the first image data with the second image data based at least on an electrical property associated with an image feature represented in the image data file.

2. A method according to claim 1, wherein the first image data column is adjacent to the second image data column in the data file, and the first recording channel is adapted to form a column of image pixels adjacent to a column of image pixels that is formed by the second recording channel.

3. A method according to claim 1, wherein the recording head is operated to form image pixel rows and image pixel columns in accordance with image data, and wherein image pixels formed by the first recording channel in accordance with the second image data are in the same image pixel rows as corresponding image pixels formed by the second recording channel in accordance with the second image data.

4. A method according to claim 3, wherein the image pixels formed by the first recording channel in accordance with the second image data are adjacent to the corresponding image pixels formed by the second recording channel in accordance with the second image data.

5. A method according to claim 4, wherein the recording head is operated to additionally form at least one image pixel in a same image pixel column as the image pixels formed by the first recording channel in accordance with the second image data.

6. A method according to claim 5, comprising forming the at least one image pixel in accordance with image data from a third image data column.

7. A method according to claim 5, wherein the at least one image pixel is formed adjacent to the image pixels formed by the first recording channel in accordance with the second image data.

8. A method according to claim 7, wherein the at least one image pixel is formed in accordance with image data from the second image data column.

9. A method according to claim 5, wherein the image data for the at least one image pixel and the second image data comprise a continuous sequence of image data in the second image data column.

10. A method according to claim 8, wherein the at least one image pixel and the image pixels formed by the first recording channel in accordance with the second image data are all pixels forming an edge of an image feature represented in the image data file.

11. A method according to claim 1, wherein the electrical property is one of an electrical conductive property and a dielectric property.

12. A method according to claim 1, wherein recording head is operated to form the image on media adapted to transfer a functional material to a substrate.

13. A method according to claim 12, wherein the image includes an image feature that corresponds to a part of an electrical element formed on the substrate with the functional material.

14. A method according to claim 13, wherein the electrical element is one of a conductor, a resistor, an inductor, a capacitor, a rectifier, a transistor, an opto-electronic device, a microwave device, and an acoustical device.

15. A method for forming an image in a skewed recording apparatus comprising a recording head comprising a plurality of recording channels, the method comprising:
providing an image data file comprising a plurality of image data columns;
assigning different portions of each image data column to different recording channels;
substituting first image data from a first image data column assigned to a first recording channel with second image data from a second image data column assigned to a second recording channel;
operating the recording head to form the image; and
comprising determining if an image feature corresponds to an electrical element or a graphical element, and substituting the first image data with the second image data in the event that the image feature is determined to correspond to the electrical element.

16. A method according to claim 15, comprising applying orthogonality corrections to the image data file.

17. A method according to claim 15, wherein the recording head is operated to form an image pixel column while scanning along both a main-scan direction and a sub-scan direction, the image pixel column extending along a direction that is skewed by a skew angle with respect to the main-scan direction, and the method comprises shifting image data in the image data file in a computer-readable memory, wherein shifts in the image data are made based at least on the skew angle.

18. A method according to claim 17, wherein the image data is shifted in a direction opposite to a direction of the image data file corresponding to the sub-scan direction.

19. A method according to claim 15, comprising reading image data from the image data file along an image data read path that is skewed with each image data column.

20. A method according to claim 19, wherein the recording head is operated to form an image pixel column while scanning along both a main-scan direction and a sub-scan direction, the image pixel column extending along a direction that is skewed by a skew angle with respect to the main-scan direction, and the image data read path is skewed with each image data column by an amount corresponding to the skew angle.

21. A method according to claim 15, comprising operating the recording head to form the image on a cylindrical surface.

22. A method according to claim 21, comprising operating the recording head to form the image by scanning along a helical path over the cylindrical surface.

23. An image forming method, comprising:
providing a media support adapted to receive media;
providing a recording head comprising a plurality of individually controllable recording channels, wherein each recording channel is adapted to form an image pixel column on the media while scanning along both a main-scan direction and a sub-scan direction, and wherein each image pixel column extends along a first direction that is skewed with respect to the main-scan direction;
providing an image data file comprising a plurality of image data columns;
assigning first image data from a first image data column to a first recording channel and forming a first group of one or more image pixels in a first image pixel column in accordance with the first image data;
assigning second image data from the first image data column to a second recording channel and forming a second group of one or more image pixels in a second image pixel column in accordance with the second image data;
assigning a third image data from the first image data column to each of the first recording channel and the second recording channel and forming a third group of one or more image pixels in each of the first image pixel column and the second image pixel column in accordance with the third image data; and
wherein each of the first image data, the second image data, and the third image data comprises image data corresponding to an image feature and the method comprises assigning the third image data to each of the first recording channel and the second recording channel based at least on an electrical property associated with the image feature.

24. A method according to claim 23, wherein the second image pixel column is adjacent to the first image pixel column.

25. A method according to claim 23, wherein the recording head is operated to form image pixel rows on the media, and each image pixel of the third group of one or more image pixels formed in the first image pixel column is formed in the same image pixel row as corresponding image pixels of the third group of one or more image pixels formed in the second image pixel column.

26. A method according to claim 23, wherein the second group of one or more image pixels is offset from the first group of one or more image pixels along the first direction, and the method comprises forming each of the third group of one or more image pixels between the second group of one or more image pixels and the first group of one or more image pixels.

27. A method according to claim 23, wherein the first image data column includes a sequence of image data in which the third image data is sequentially arranged between the first image data and the second image data.

28. A method according to claim 27, wherein an arrangement of the first image data, the third image data and the second image data comprises a continuous sequence of image data.

29. A method according to claim 23, wherein the image pixels in the first group of one or more image pixels, the second group of one or more image pixels and each of the third group of one or more image pixels are contiguously arranged in a stair-case pattern.

30. A method according to claim 23, wherein the image pixels in the first group of one or more image pixels, the second group of one or more image pixels and each of the third group of one or more image pixels are all image pixels forming an edge of an image feature.

31. A method according to claim 23, wherein the electrical property is one of an electrical conductive property and a dielectric property.

32. A method according to claim 23, wherein the media is adapted to transfer a functional material to a substrate.

33. A method according to claim 32, wherein each of the first image data, the second image data and the third image data comprises image data, representative of an image feature corresponding to a part of an electrical element formed on the substrate with the functional material.

34. A method according to claim 33, wherein the electrical element is one of a conductor, a resistor, an inductor, a capacitor, a rectifier, a transistor, an opto-electronic device, a microwave device, and an acoustical device.

35. An image forming method, comprising:
providing a media support adapted to receive media;
providing a recording head comprising a plurality of individually controllable recording channels, wherein each recording channel is adapted to form an image pixel column on the media while scanning along both a main-scan direction and a sub-scan direction, and wherein each image pixel column extends along a first direction that is skewed with respect to the main-scan direction;
providing an image data file comprising a plurality of image data columns;
assigning first image data from a first image data column to a first recording channel and forming a first group of one or more image pixels in a first image pixel column in accordance with the first image data;
assigning second image data from the first image data column to a second recording channel and forming a second group of one or more image pixels in a second image pixel column in accordance with the second image data;

assigning a third image data from the first image data column to each of the first recording channel and the second recording channel and forming a third group of one or more image pixels in each of the first image pixel column and the second image pixel column in accordance with the third image data; and wherein each of the first image data, the second image data and the third image data comprises image data corresponding to an image feature, and the method comprises determining if the image feature corresponds to an electrical element or a graphical element, and assigning the third image data to each of the first recording channel and the second recording channel in the event that the image feature is determined to correspond to the electrical element.

36. A method according to claim 35, comprising applying orthogonality corrections to the image data file.

* * * * *